United States Patent
Irvin et al.

(10) Patent No.: US 8,053,582 B1
(45) Date of Patent: *Nov. 8, 2011

(54) PROCESS FOR MAKING TETRAZOLE BASED CROSS-LINKED POLYMERS

(75) Inventors: David J. Irvin, Ridgecrest, CA (US); Mark H. Mason, Inyokern, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 385 days.

This patent is subject to a terminal disclaimer.

(21) Appl. No.: 12/238,904

(22) Filed: Sep. 26, 2008

Related U.S. Application Data

(62) Division of application No. 11/151,181, filed on May 27, 2005, now Pat. No. 7,517,997.

(51) Int. Cl.
*C07D 257/04* (2006.01)

(52) U.S. Cl. ............................................... 548/250
(58) Field of Classification Search ............... 548/250
See application file for complete search history.

(56) References Cited

U.S. PATENT DOCUMENTS 7,517,997 B1 * 4/2009 Irvin et al. ................ 548/250

* cited by examiner

*Primary Examiner* — Susannah Chung
(74) *Attorney, Agent, or Firm* — Charlene A. Haley; Brian F. Drazich

(57) ABSTRACT

A cross-linked polyisocyanate polymer and a process for preparation of a polymer having the general structure (I) including reacting an effective amount of tetrazole polyol with isocyanate resin, combining at a temperature in the range of about 50° C. to about 100° C. for a time period in the range of about 1 to about 24 hours and cooling to room temperature producing a cross-linked polyisocyanate polymer.

14 Claims, No Drawings

PROCESS FOR MAKING TETRAZOLE BASED CROSS-LINKED POLYMERS

This is a divisional of U.S. patent application Ser. No. 11/151,181, filed May 27, 2005 now U.S. Pat. No. 7,517,997.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

There is a need for novel energetic binders to increase the performance of pyrotechnics, gun propellants, rocket propellants, air-bag gas generator propellants, and explosives. Depending on the application, these materials are typically 3-25% binder by mass. Therefore, improvements to the energy content, mechanical properties, or insensitive munitions properties of the polymeric binder can have significant affects on the performance of the energetic material in question.

In general many pyrotechnics, propellants, explosives are comprised of a polymeric binder that holds one or more energetic solids in a plastic matrix. The polymeric binder serves many roles in these materials. Initially the polymer can aid in processing. In fact, the properties of the polymer will significantly affect how a material is processed, wether it is cast or pressed or extruded. Furthermore, the polymer mechanically holds all the ingredients together, serving as a structural element literally binding together the final material. This role is especially critical in rocket propellants, because cracks and voids in the propellant will lead to motor grain failure, often with catastrophic results. The binder serves many safety functions. The binder physically coats the energetic solids in these materials, this provides a physical buffer to minimize the physical and chemical interaction of reactive solids with each other. This generally lowers the electrostatic discharge, impact, and friction sensitivity of the final material. In some materials, especially rocket propellants, the binder also serves as a fuel when the hydrocarbon polymer is combusted by the oxidizer. However, the binder generally diminishes the performance (detonation pressure and velocity) of most explosives. To improve the performance of explosives with significant binder content, and to increase the energy density of propellants energetic polymers are needed.

While there are energetic binders available (polyglycidyl nitrate (PGN), polyglycidyl azide (GAP), azidomethyl-methyl-oxetane (AMMO), bis((azido-methyl)oxetane) (BAMMO), nitratomethyl-methyloxetane (NMMO), etc.) the safety benefits of increasing binder content are lost because these materials contain either organic azides or nitrate esters (or both). These functional groups are chemically unstable, easily ignited, and generally create reactive fragments on aging. In fact, propellants that utilize nitrate esters generally require expensive monitoring programs throughout their life cycle to insure both adequate safety properties and performance as the propellant ages. The cost of such monitoring is often cited as one reason most modern explosives do not to use nitrate esters as binder materials. Furthermore, the energetic groups are pendant moieties attached to the polymer, but not incorporated into the polymer backbone. This impairs the physical properties of these polymers and causes the formulator to need a higher weight percent of binder in order to achieve adequate coating. In short, there is a need for improved energetic binders to address safety, performance, aging, and processing requirements.

While tetrazoles are somewhat less energetic than azides or nitrates, the bis-alkyltetrazoles of interest are more thermally stable and substantially less chemically reactive. Higher percentages of these binders could be used without anticipating negative safety consequences. Furthermore, the energetic functionality is built into the polymer backbone, minimizing the total moles of pendant atoms. This is anticipated to yield a binder with superior physical properties. A dihydroxy-terminated bis-tetrazole (2,2 Bis((2-ethanol)-1 or 2H-tetrazole)-propane or BETP) has been synthesized on the multigram scale. Initial differential scanning calorimetery (DSC) analysis shows this pre-polymer has promise as an energetic cured urethane binder for explosives and propellants and gas generatos.

U.S. Pat. No. 5,053,086 issued on Oct. 1, 1991 to Henry, et al., which teaches gas generating compositions containing energetic high nitrogen such as ammonium 5-nitraminotetrazole and 5,5'-bitetrazole. This work yielded polymeric binders that are too rigid and "glassy" for the intended application. The chemical structure of the present invention polymers builds more flexibility into the backbone, yielding improved elastomers. Further research by Demko teaches the addition of sodium azide to nitriles to give 1H-tetrazoles in water with zinc salts as catalysts. (Demko, Z. P.; Sharpless, K. B. "Preparation of 5-substituted 1H-tetrazoles from nitriles in water." J. Org. Chem. 2001, 66, 7945). This step is only one method to obtain the tetrazole intermediate. Further reaction is necessary to produce the alcohol-based monomers. The addition of the alkyl alcohol is two fold: first, the short alkyl chain adds flexibility, solubility; second, the alcohol group allows for the production of stable polyurethanes. Polymerization of the tetrazole would produce the less stable polyurea.

Tetrazole compounds have application in many fields including, but not limited to, chemistry, ligands, metabolically stable surrogate for a carboxylic acid group, and material sciences including explosives and propellants and air bag gas generators.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments and in the appended claims.

DETAILED DESCRIPTION OF THE INVENTION

Embodiments of the present invention generally relate to a process for making energetic cast cured binders by using tetrazole polyols and isocyanate resins for making multifunctional tetrazole based cross-linked polymers. Other embodiments of the present invention relate to a process for preparation of a polymer having the general structure (I) comprising: reacting an

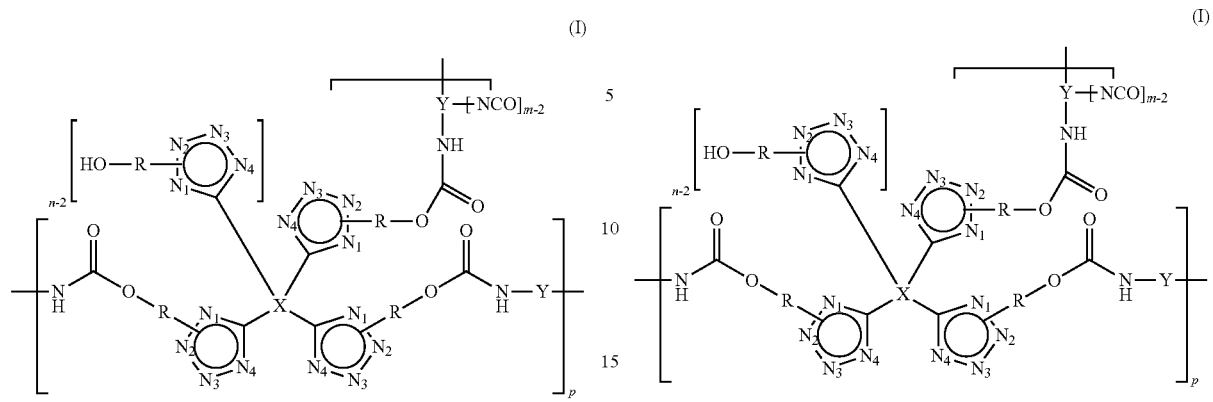

(I)

effective amount of tetrazole polyol having the general structure (II) with isocyanate resin, wherein [X] comprises at least one group of alkyls, aryls, and oligoethers, wherein [R] comprises at least one group of alkyls, aryls, and oligoethers, wherein [n] is 2-9, wherein [R] is chemically bonded to $N_1$ or $N_2$ position; wherein the isocyanate resin having the general structure (III), wherein [Y]

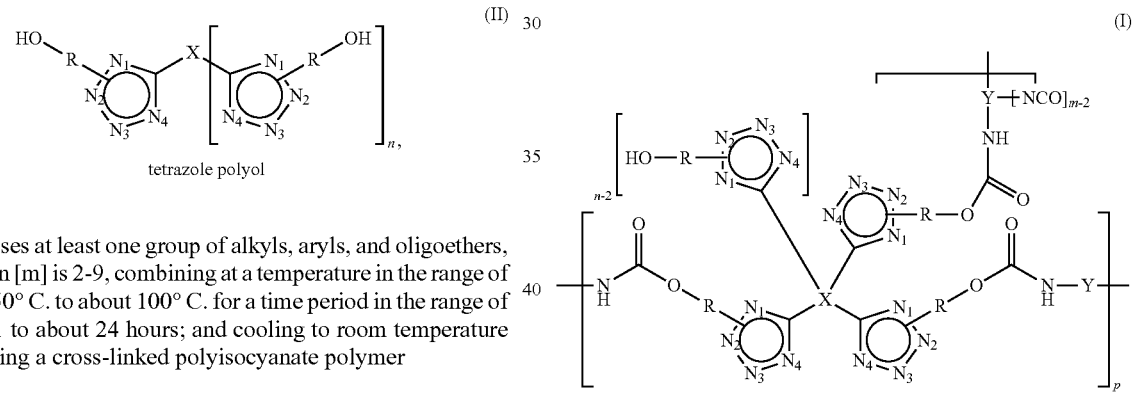

tetrazole polyol (II)

comprises at least one group of alkyls, aryls, and oligoethers, wherein [m] is 2-9, combining at a temperature in the range of about 50° C. to about 100° C. for a time period in the range of about 1 to about 24 hours; and cooling to room temperature producing a cross-linked polyisocyanate polymer

(III)

having the general structure (I), wherein [X] comprises at least one group of alkyls, aryls, and oligoethers, wherein [Y] comprises at least one group of alkyls, aryls, and oligoethers, wherein [m] is 2-9, wherein [n] is up to 7, wherein [p] is about 5 to about 10,000, wherein [R] comprises at least one group of alkyls, aryls, and oligoethers, wherein [R] is chemically bonded to $N_1$ or $N_2$ position of the cross-linked polyisocyanate polymer (I).

In other embodiments, the process further comprises combining at least one catalyst and filler together with the tetrazole polyol (II) and the isocyanate resin. In yet other embodiments, the value of [p] of the cross-linked polyisocyanate polymers is about 5 to about 1,000. The polyisocyanate polymer is produced by the process above.

Another embodiment of the present invention includes a polymer having the general structure (I) comprising: wherein [p] is a value of about 5 to about 10,000; wherein [n] is a value up to 7; wherein [m] is a value of 2 to 9; wherein [X] comprises at least one group of alkyls, aryls, and oligoethers; wherein [R] comprises at least one group of alkyls, aryls, and oligoethers; wherein [R] is chemically bonded to $N_1$ or $N_2$ position; and wherein [Y] comprises at least one group of alkyls, aryls, and oligoethers. In other embodiments, [p] of the polyisocyanate polymer is about 5 to about 1,000.

Still yet other embodiments include a polymer having the general structure (I) produced by the process, comprising: an effective amount of tetrazole polyol having the general structure (II),

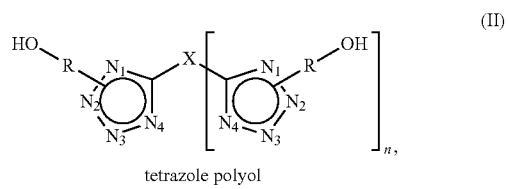

(I)

wherein [X] comprises at least one group of alkyls, aryls, and oligoethers, wherein [R] comprises at least one group of alkyls, aryls, and oligoethers, wherein [n] is 2-9, wherein [R] is chemically bonded to $N_1$ or $N_2$ position; and an effective amount of isocyanate resin having the general

tetrazole polyol (II)

structure (III) reacting with the isocyanate resin, wherein [Y] comprises at least one group of $$OCN-Y-[NCO]_m,$$  (III)

alkyls, aryls, and oligoethers, wherein [m] is 2-9, combining at a temperature in the range of about 50° C. to about 100° C. for a time period in the range of about 1 to about 24 hours, cooling to room temperature producing a cross-linked polyisocyanate polymer having the general structure (I), wherein [X] comprises at least one group of alkyls, aryls, and oligoethers, wherein [Y] comprises at least one group of alkyls, aryls, and oligoethers, wherein [m] is 2-9, wherein [n] is up to 7, wherein [p] is about 5 to about 10,000, wherein [R] comprises at least one group of alkyls, aryls, and oligoethers, wherein [R] is chemically bonded to $N_1$ or $N_2$ position of the cross-linked polyisocyanate polymer (I). In other embodiments, [p] of the polyisocyanate polymer is about 5 to about 1,000.

Although all embodiments of the present invention include any combinations of [X], [Y], [R], [m], [n], and [p], the following are examples of some genus and species embodiments. When [X] of the polyisocyanate polymer (I) comprises an alkyl group, [Y] includes an alkyl group and [R] includes an alkyl group. When [X] of the polyisocyanate polymer (I) comprises an alkyl group, [Y] includes an aryl group and [R] includes an oligoether group. When [X] of the polyisocyanate polymer (I) comprises an alkyl group, [Y] includes an oligoether group and [R] includes an aryl group. When [X] of the polyisocyanate polymer (I) comprises an aryl group, [Y] includes an alkyl group and [R] includes an oligoether group. When [X] of the polyisocyanate polymer (I) comprises an aryl group, [Y] includes an alkyl group and [R] includes an aryl group. When [X] of the polyisocyanate polymer (I) comprises an aryl group, [Y] includes an oligoether group and [R] includes an alkyl group. When [X] of the polyisocyanate polymer (I) comprises an oligoether group, [Y] includes an oligoether group and [R] includes an oligoether group. When [X] of the polyisocyanate polymer (I) comprises an oligoether group, [Y] includes an alkyl group and [R] includes an aryl group. When [X] of the polyisocyanate polymer (I) comprises an oligoether group, [Y] includes an aryl group and [R] includes an alkyl group. Embodiments of the present invention further comprise combining at least one catalyst and filler together with the tetrazole polyol (II) and the isocyanate resin.

Experimental Result
  Example of Polymerization
    Difunctional Tetrazole with Difunctional Isocyanate In a glass vial equipped with a stir bar, dihydroxy(2,2-dimethyl) bis tetrazole (95 mg), hexamethylene di-isocyanate (60 mg), tetrahydrofuran (5 mL) and dimethylaminopyridine catalyst were combined and stirred at 65° C. for 2 hours, to yield a pale yellow solid rubber. The solid was analyzed by DSC.

Difunctional Tetrazole with Trifunctional Isocyanate

In a glass vial equipped with a stir bar, dihydroxy(2,2-dimethyl) bis tetrazole (200 mg), tri functional isocyanate (Tolunate LV) (98 mg), and dimethylaminopyridine catalyst (20 mg) were combined and stirred at 60° C. for 12 hours, to yield a pale yellow solid rubber. The solid was analyzed by DSC.

Tetrafunctional Tetrazole with Trifunctional Isocyanate

In a glass vial equipped with a stir bar, tetra tetrazole (500 mg), tri functional isocyanate (Tolunate LV) (500 mg), and triphenyl bismith catalyst (50 mg) were combined and stirred at 60° C. for 12 hours, to yield an off-white rubbery foam. The solid was analyzed by DSC.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A polymer of structure (I) comprising:

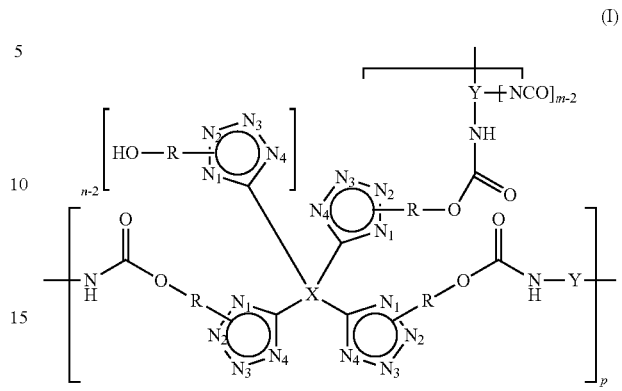

(I)

wherein "p" is a value of about 5 to about 10,000;
wherein "n" is a value from 1 to 7;
wherein "m" is a value of 2 to 9;
wherein "X" is an alkyl group;
wherein "R" is an alkyl group or oligoether; wherein "R" is chemically bonded to $N_1$ or $N_2$ position; and
wherein "Y" is an alkyl group or aryl.

2. The polymer according to claim 1, wherein said "p" of said polymer is about 5 to about 1,000.

3. A polymer of structure (I) produced by the process, comprising:

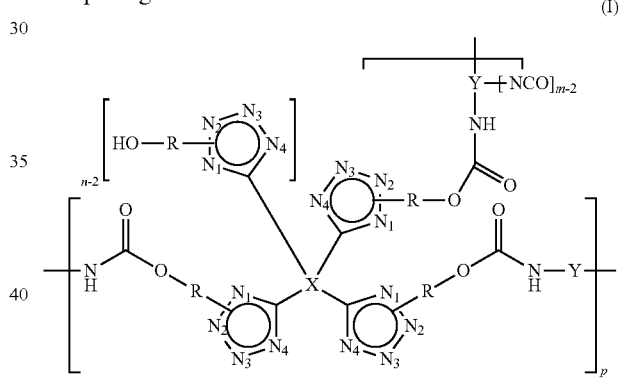

(I)

wherein "X" is an alkyl group, wherein "Y" is an alkyl group, wherein "R" is an alkyl group, wherein "p" is about 5 to about 10,000, wherein "n" is 2-9, wherein "m" is 2-9, wherein "R" is chemically bonded to $N_1$ or $N_2$ position;

reacting an isocyanate resin with an effective amount of tetrazole polyol of

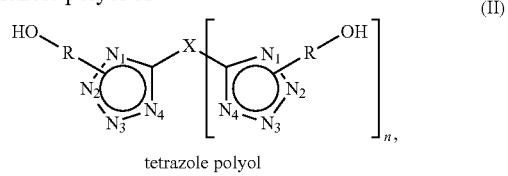

(II)

tetrazole polyol structure (II),
  wherein "R" is an alkyl group, wherein "n" is 2-9, with an effective amount of isocyanate resin of structure (III)

(III)

wherein "Y" is an alkyl group, wherein "m" is 2-9, about 50° C. to about 100° C. for about 1 hour to about 24 hours;

cooling to room temperature; and extracting a cross-linked polyisocyanate polymer of structure (I), wherein "X" is an alkyl group, wherein "Y" is an alkyl group, wherein "m" is 2-9, wherein "n" is 2-9, wherein "p" is about 5 to about 10,000, wherein "R" is an alkyl group, wherein "R" is chemically bonded to $N_1$ or $N_2$ position of said cross-linked polyisocyanate polymer of structure (I), wherein optionally "Y" is an aryl group and "R" is an oligoether group.

4. The polymer according to claim 1, wherein said "p" of said cross-linked polyisocyanate polymer of structure (I) is about 5 to about 1,000.

5. The polymer according to claim 1, wherein "X" of said polyisocyanate polymer of structure (I) is an alkyl group, wherein "Y" is an alkyl group and "R" is an alkyl group.

6. The polymer according to claim 1, wherein "X" of said polyisocyanate polymer of structure (I) is an alkyl group, wherein "Y" is an aryl group and "R" is an oligoether group.

7. The polymer according to claim 1, wherein "X" of said polyisocyanate polymer of structure (I) is an alkyl group, wherein "Y" is an oligoether group and "R" is an aryl group.

8. The polymer according to claim 1, wherein "X" of said polyisocyanate polymer of structure (I) is an aryl group, wherein "Y" is an alkyl group and "R" is an oligoether group.

9. The polymer according to claim 1, wherein "X" of said polyisocyanate polymer of structure (I) is an aryl group, wherein "Y" is an aryl group and "R" is an aryl group.

10. The polymer according to claim 1, wherein "X" of said polyisocyanate polymer of structure (I) is an aryl group, wherein "Y" is an oligoether group and [R] includes an alkyl group.

11. The polymer according to claim 1, wherein "X" of said polyisocyanate polymer of structure (I) is an oligoether group, wherein "Y" is an oligoether group and "R" is an oligoether group.

12. The polymer according to claim 1, wherein "X" of said polyisocyanate polymer of structure (I) is an oligoether group, wherein "Y" is an alkyl group and "R" is an aryl group.

13. The polymer according to claim 1, wherein "X" of said polyisocyanate polymer of structure (I) is an oligoether group, wherein "Y" is an aryl group and "R" is an alkyl group.

14. The polymer according to claim 3, further including at least one catalyst and filler combined together with said tetrazole polyol of structure (II) and said isocyanate resin.

* * * * *